US007414576B1

(12) United States Patent
Liu

(10) Patent No.: US 7,414,576 B1

(45) Date of Patent: Aug. 19, 2008

(54) PRECISION RF ANTENNA POINTING

(75) Inventor: Ketao Liu, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/627,360

(22) Filed: Jan. 25, 2007

(51) Int. Cl.
*H01Q 3/00* (2006.01)
*G01S 5/04* (2006.01)

(52) U.S. Cl. ........................ 342/359; 342/368; 342/442

(58) Field of Classification Search ................. 342/360, 342/442

See application file for complete search history.

(56) References Cited

U.S. PATENT DOCUMENTS

| | | | | |
|---|---|---|---|---|
| 5,771,019 A * | 6/1998 | Wachs et al. | ................ | 342/442 |
| 6,771,217 B1 * | 8/2004 | Liu et al. | .................... | 342/368 |
| 6,982,678 B2 * | 1/2006 | Obert et al. | ................. | 343/775 |
| 7,298,325 B2 * | 11/2007 | Krikorian et al. | ........... | 342/359 |
| 2007/0126629 A1 * | 6/2007 | Krikorian et al. | ........... | 342/359 |

* cited by examiner

*Primary Examiner*—Gregory C Issing
(74) *Attorney, Agent, or Firm*—Hope Baldauff Hartman, LLC

(57) ABSTRACT

A precision antenna pointing system and methods are disclosed. Antenna pointing error is determined by detecting RF signal phases at locations along the edge of an antenna reflector. A set of signal phase reference harnesses are used to compensate for harness induced errors. Furthermore, multiplexing is used to minimize electronics induced phase errors.

10 Claims, 5 Drawing Sheets

| | | | | | | |
|---|---|---|---|---|---|---|
| | FREQUENCY (Ghz) | 6 | 6 | 6 | 6 | 6 |
| | SPEED OF LIGHT (M-m/s) | 300 | 300 | 300 | 300 | 300 |
| 306 | WAVE LENGTH (m) | 0.05 | 0.05 | 0.05 | 0.05 | 0.05 |
| 308 | PHASE ERROR RATIO (m-m/deg) | 0.1 | 0.1 | 0.1 | 0.1 | 0.1 |
| 310 | ANTENNA BASE DIMENSION (m) | 1.00 | 2.00 | 3.00 | 4.00 | 5.00 |
| 312 | PHASE ANGLE ERROR RATIO (m-deg/deg) | 8 | 4 | 3 | 2 | 2 |

*FIG. 3*

PRECISION RF ANTENNA POINTING

TECHNICAL FIELD

Embodiments of the present disclosure relate generally to Line-Of-Sight (LOS) pointing of spacecraft radio frequency (RF) antennas. More particularly, embodiments of the present disclosure relate to correction of LOS pointing errors of spacecraft RF antennas.

BACKGROUND

Precision pointing of an antenna LOS is used to accurately direct transmitting or receiving of an RF beam of an antenna to a receiving or transmitting antenna at a distance from the antenna. For spacecraft RF antennas, high precision is required because even small deviations from a correct LOS can result in a very large drop in signal power from transmitting antennas to receiving antennas. This is due to the fact that there is a large distance between spacecraft or ground antennas that transmit RF signals and ground or spacecraft antennas that receive the signals.

Many spacecraft RF communication and radar antennas require precision LOS pointing to meet mission objectives. Alignment, launch shift, deployment error and thermal deformation can all cause pointing errors. Alignment error is antenna miss-pointing error due to the fact that the LOS of an antenna is not aligned in the required direction. Launch shift error is antenna LOS shift caused by a rocket launch. Deployment error results from inaccuracy of a deployment mechanism. Thermal deformation error is caused by temperature change induced antenna structure deformation when the spacecraft is orbiting in its orbit. Alignment error, launch shift, and deployment error can be measured and corrected during spacecraft initial orbit calibration. Thermal antenna deformation, however, can not be completely calibrated and usually causes a significant amount of spacecraft antenna LOS pointing error during on-orbit operation.

A ground based beacon is often used to measure spacecraft RF antenna LOS pointing errors during operation on-orbit. These errors include the error caused by antenna structural thermal deformation. For commercial spacecraft, maintaining a ground based beacon for about 15-18 years is very expensive as equipment, facilities and human operation can easily cost customers millions of dollars. In many military applications, ground based beacons cannot be used because of their vulnerability to enemy attacks. Sometimes, in commercial applications, ground based beacons are unavailable in the antenna coverage area of the spacecraft.

BRIEF SUMMARY

A precision antenna pointing system and methods that measure and correct antenna structural deformation are disclosed. The system includes: an RF signal transmitting horn located a distance from an antenna reflector, which transmits an RF signal toward an antenna reflector, signal receiving horns attached to an edge of the antenna reflector, which receive the RF signal, an RF signal phase detector which is coupled to the signal receiving horn by receiving electronics and signal transportation harness, and is configured to estimate the phase of the RF signal received at each receiving horn; a LOS pointing estimator coupled to the signal processing electronics and phase detector, which estimates the precision RF antenna LOS pointing deviations using the phase estimates, and a stepping controller coupled to the antenna LOS pointing estimator, which corrects the RF antenna LOS pointing error based upon the estimates of the RF antenna LOS pointing deviations.

To achieve precision measurement and precision correction of antenna LOS pointing errors, the system uses a reference RF signal harness to compensate for signal phase variations in a signal transportation harness, and uses a multiplexer to multiplex RF signals from a transmitting horn and from each of the receiving horns with the same receiving electronics to minimize phase variations introduced by receiving electronics. The method uses phase differences between signals from the receiving horns and the signal from the transmitting horn, and phase differences between the signals from reference harness and the signal from transmitting horn to achieve a precision estimate of antenna LOS pointing.

According to an embodiment of the disclosure, the method first calibrates RF signal phase differences of the RF antenna LOS pointing control system at an initial calibration time to obtain reference signal phase differences. Then the method multiplexes measurement signals at measurement times, derives measurement signal phase differences based on the measurement signals, and computing signal phase changes between the reference signal phase differences and the measurement signal phase differences. Based on the signal phase changes, the method then estimates a precision phase deviation and generates an antenna LOS pointing estimate based on the precision phase deviation and computes an antenna actuator stepping command based on the antenna LOS pointing estimate. Next; the method corrects RF antenna LOS pointing based on the antenna actuator stepping command.

According to another embodiment of the disclosure, a further method continuously transmits a reference signal toward an antenna reflector to obtain a transmitting reference signal. The method then continuously receives the reference signal at reference signal receivers attached to an edge of the antenna reflector, and derives a phase estimate of the reference signal received at each of the reference signal receivers to obtain phase estimates. Then, the method computes estimates of precision RF antenna LOS pointing deviations using the phase estimates, and corrects the RF antenna LOS pointing error based upon the estimates of the precision RF antenna LOS pointing deviations.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the embodiments of the present disclosure may be derived by referring to the detailed description and claims when considered in conjunction with the following figures, wherein like reference numbers refer to similar elements throughout the figures.

FIG. 3 is a table illustrating the ratio of an RF antenna LOS pointing determination error to an RF signal phase measurement error with respect to the size of an RF antenna reflector;

DETAILED DESCRIPTION

The following detailed description is merely illustrative in nature and is not intended to limit the embodiments of the disclosure or the application and uses of such embodiments. Furthermore, there is no intention to be bound by any expressed or implied theory presented in the preceding technical field, background, brief summary or the following detailed description.

Embodiments of the disclosure may be described herein in terms of functional and/or logical block components and various processing steps. It should be appreciated that such block components may be realized by any number of hardware, software, and/or firmware components configured to perform the specified functions. For example, an embodiment of the disclosure may employ various circuit components, e.g., wave guides, impedance matching, signal delays, signal processing elements, memory elements, logic elements, or the like, which may carry out a variety of functions under the control of one or more microprocessors or other control devices. In addition, those skilled in the art will appreciate that embodiments of the present disclosure may be practiced in conjunction with a variety of different antenna systems and antenna configurations, and that the system described herein is merely one example embodiment of the disclosure.

For the sake of brevity, conventional techniques and components related to antenna systems, antenna system controls, analog signal processing, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
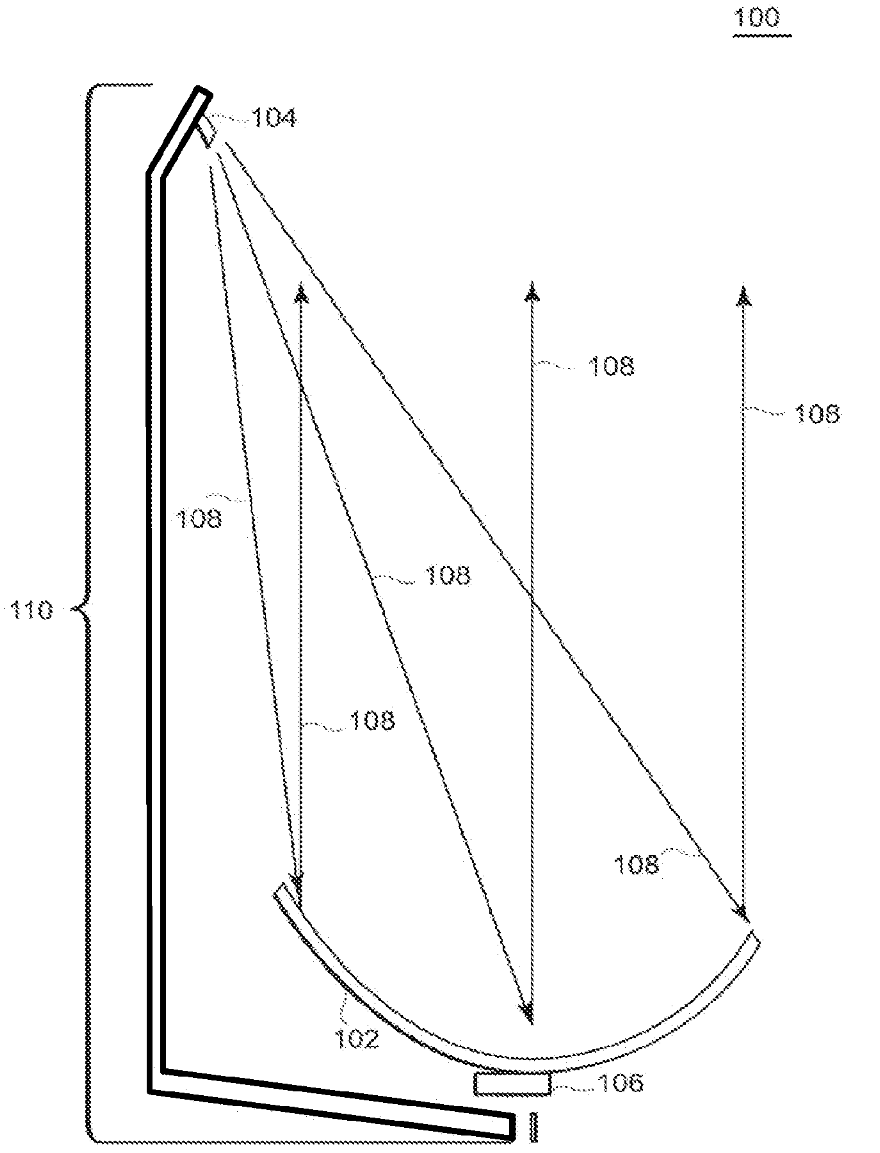
FIG. 1 is a schematic representation of the basic elements of a typical RF satellite antenna.
Figure 2:
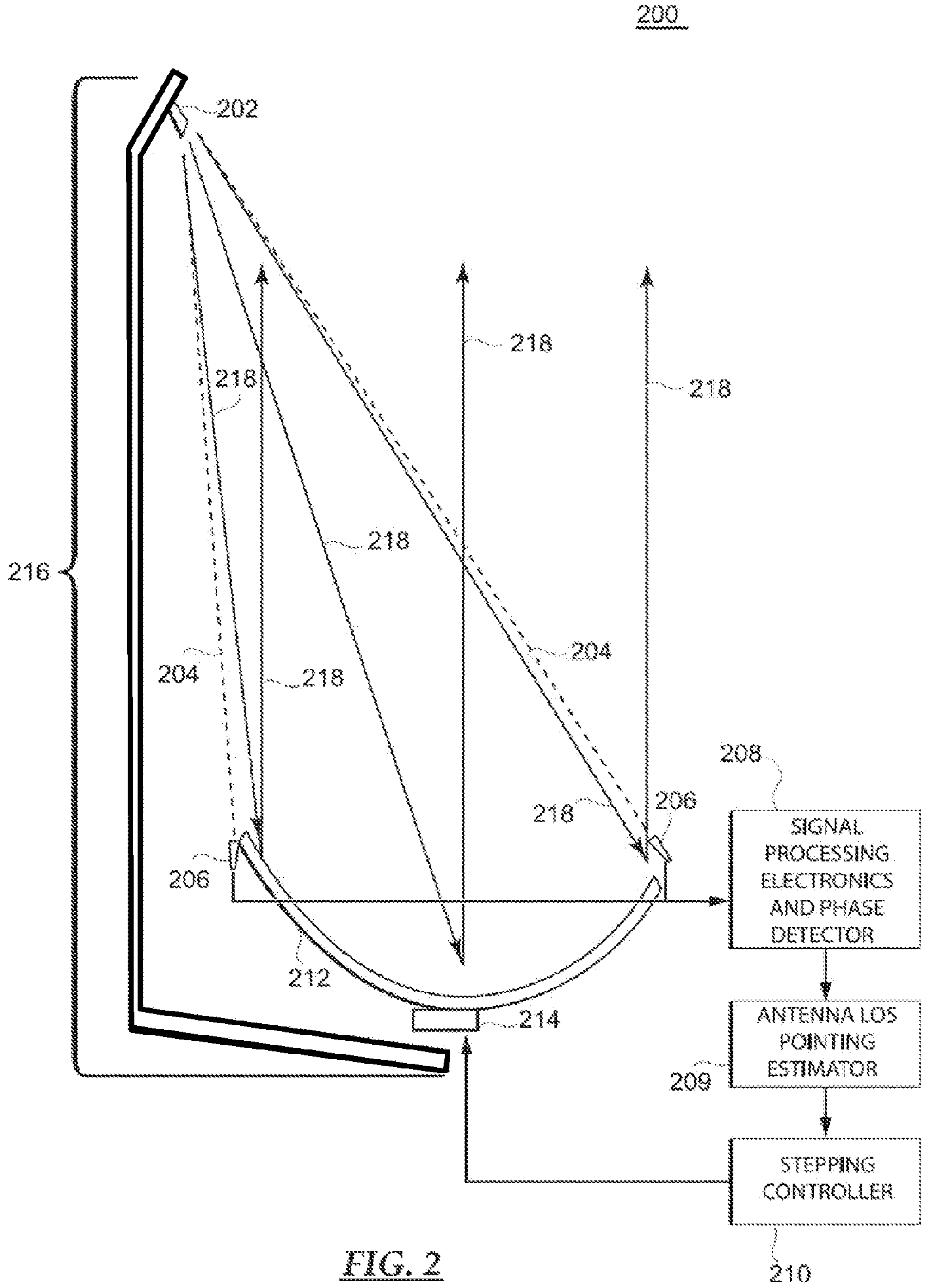
FIG. 2 is a diagram that illustrates an embodiment of a precision RF antenna LOS pointing control system that measures the RF antenna LOS pointing by detecting RF signal phases and that controls the RF antenna LOS by stepping the reflector of the RF antenna.
Figure 4:
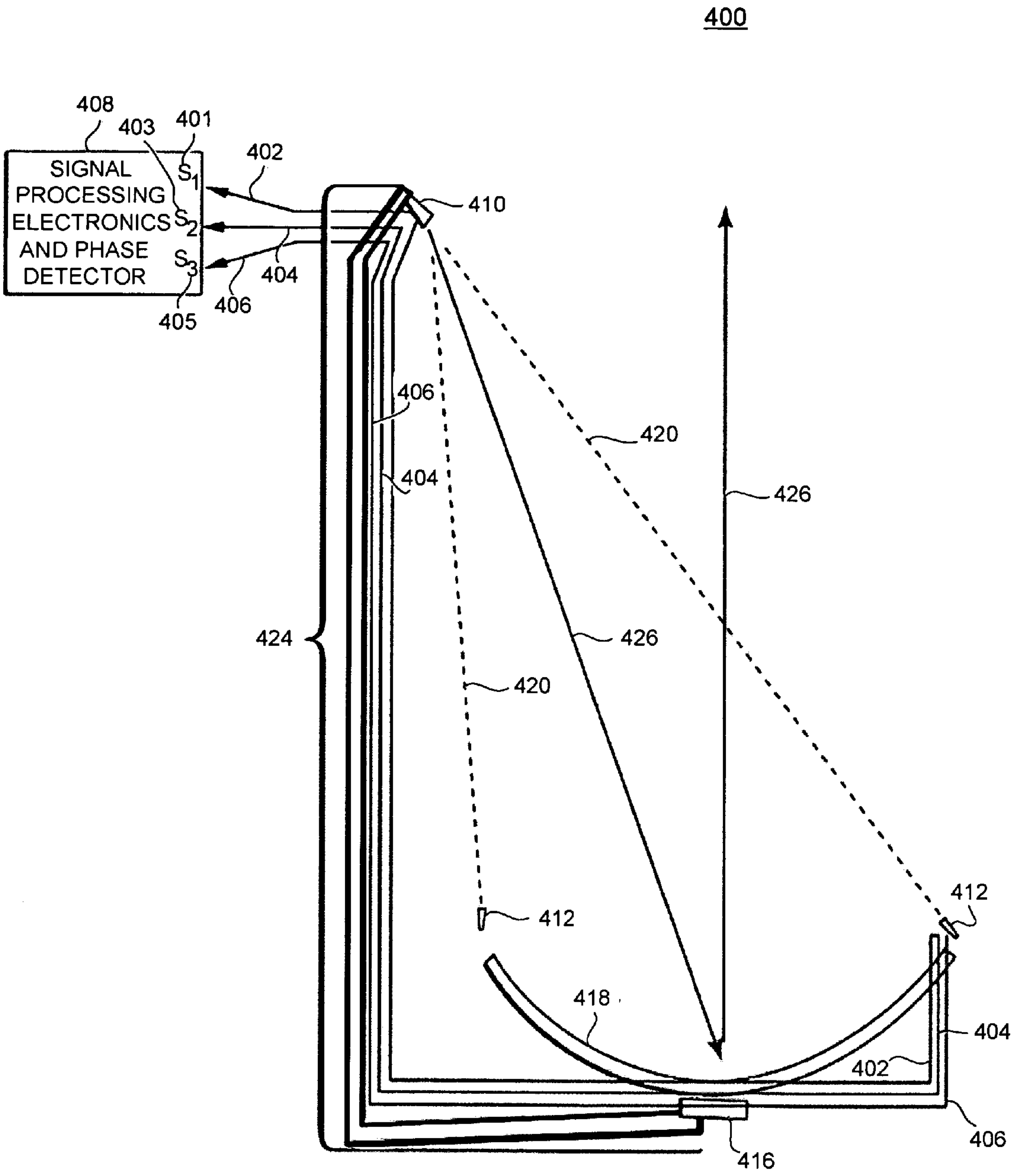
FIG. 4 is a diagram that illustrates an embodiment of a precision RF antenna LOS pointing control system that uses a reference harness to compensate for transporting harness and electronics induced phase variations.

The following description refers to elements or nodes or features being “connected” or “coupled” together. As used herein, unless expressly stated otherwise, “connected” means that one element/node/feature is directly joined to (or directly communicates with) another element/node/feature, and not necessarily mechanically. Likewise, unless expressly stated otherwise, “coupled” means that one element/node/feature is directly or indirectly joined to (or directly or indirectly communicates with) another element/node/feature, and not necessarily mechanically. Thus, although FIGS. 1, 2 and 4 depict example arrangements of elements, additional intervening elements, devices, features, or components may be present in an embodiment of the disclosure.

While many types of antennas may be used, for this example embodiment a parabolic radar antenna will be used for illustration. A parabolic antenna is a high-gain reflector antenna used for radio, television and data communications, and also for radiolocation (RADAR), on the UHF and SHF parts of the electromagnetic spectrum. A typical parabolic antenna includes a parabolic reflector illuminated by a small feed antenna. FIG. 1 is a schematic representation of a typical radio frequency (RF) antenna system 100. Antenna system 100 may include: a parabolic reflector 102, an RF signal transmit/receive horn 104, pointing axis actuators 106, and an antenna structure (one piece structure) 110 configured to deploy and to hold the antenna. Antenna system 100 is configured to produce an outgoing ranging radar signal (signal beam) 108. The parabolic reflector 102 concentrates an incoming signal beam 108 and/or provides directionality to an outgoing signal beam 108. Like the parabolic reflector 102, an RF signal transmitter/receiver horn 104 provides directionality and/or concentration to the signal beam 108, but uses refraction instead of reflection. The pointing axis stepping actuators 106 physically move the parabolic reflector 102 in order to point the Line Of Sight (LOS) of antenna system 100.

Precision pointing is important for RF antennas to meet pointing performance requirements and achieve effective operation. Because structural deformation could result in significant spacecraft antenna pointing inaccuracy on orbit, accurate structural deformation measurement is desirable.

According to the embodiments of the disclosure, antenna LOS pointing at a given time is determined by measuring RF signal phases of received RF signals at several points on the RF antenna reflector. This RF signal is transmitted from the transmitting horn at a reference point on a spacecraft structure, and therefore the RF signal phase difference between the signal at the transmitting horn and the received signal at the receiving horn on the reflector is indicative of the distance between this reference point and the receiving horn on the RF antenna reflector. These distance measurements are then used to determine spacecraft antenna pointing errors. In order to achieve high accuracy in the pointing error determination, precision phase measurements of the RF signals are important. Two important factors can cause significant errors in these phase measurements. The first factor is measured phase variation caused by a transporting harness used for transmitting a received RF signal to signal phase detection electronics. Temperature and other factors can alter harness transmitting delay, and thus result in the phase variation. The second factor is electronics phase variations in different signal phase detection channels. Each of these channels is used to detect the phase of the RF signal from a specific point on the antenna. This disclosure uses a reference signal harness to compensate for harness induced errors. Furthermore, this disclosure uses a single phase detection channel for all the RF signals. The phase detection channel is multiplexed for the processing of all the RF signals to minimize electronics error variations of RF signals received at different points on the RF antenna system.

FIG. 2 is a diagram that illustrates an embodiment of a precision RF antenna LOS pointing control system 200 that is suitably configured to measure the RF antenna LOS pointing by detecting RF signal phases. The RF signal phase measurements are used to derive RF antenna LOS pointing. According to the example embodiment shown in FIG. 2, an antenna system 200 may include, without limitation: an RF signal transmit horn 202; signal receiving horns 206; an RF signal transportation harness, an RF signal processing electronics and phase detector 208, an RF antenna LOS pointing estimator 209, an antenna reflector stepping actuator controller 210, an RF antenna parabolic reflector 212, a pointing axis stepping actuator 214, and an antenna support structure 216. The RF signal transportation harness couples signal receiving horns 206 to the RF processing electronics and phase detector 208. Antenna system 200 is generally configured to produce an operational RF signal beam 218 to provide operational communication or radar service. For a transmitting RF antenna, this beam 218 also covers signal receiving horns 206 at the edge of antenna reflector and becomes the reference signal 204 for antenna pointing measurement. For a receiving antenna, a transmitting horn is needed to provide a source signal for the RF signal measurement at the signal receiving horn 206. Antenna system 200 may share some elements of antenna system 100 as described above in the context of FIG. 1. Accordingly, certain features, components, and functions of antenna system 200 will not be redundantly described here.

Reference signal transmitting horn 202 is located a distance from the antenna parabolic reflector 212 and is configured to transmit a reference signal 204 toward the antenna parabolic reflector 212.

The signal receiving horns 206 are attached to the edge of antenna parabolic reflector 212 and each signal receiving horn 206 is configured to receive the reference signal 204. When reflector orientation changes due to deformation of antenna support structure 216, signal receiving horns 206 from one side of the antenna edge move away from reference signal transmitting horn 202 and signal receiving horns 206 from the other side move close to the reference signal transmitting horn 202. Therefore, by determining the distance from each signal receiving horn 206 to the reference signal transmitting horn 202, one can derive orientation change of the antenna parabolic reflector 212, and thus determine the LOS pointing of the antenna system 200.

RF signal processing electronics and phase detector 208 is coupled to the signal receiving horn 206 by an RF signal transportation harness, and is configured to detect the phase estimate of the reference signal 204 received at each signal receiving horn 206 to obtain estimates of phase differences between the transmitting reference signal and the received reference signal at each of the signal receiving horns 206. The distance from the reference signal transmitting horn 202 to each respective signal receiving horn 206 can be calculated knowing these phase estimates at the RF signal processing electronics and phase detector 208.

RF antenna LOS pointing estimator 209 is coupled to the RF signal processing electronics and phase detector 208 and is configured to compute estimates of precision RF antenna LOS pointing deviations using estimates of the phase differences detected at the RF signal processing electronics and phase detector 208. The RF antenna LOS pointing estimator 209 generates LOS pointing estimates of precision RF antenna LOS pointing control system 200.

Stepping controller 210 is coupled to the RF antenna LOS pointing estimator 209 and is configured to correct the RF antenna LOS pointing error based on the estimates of precision RF antenna LOS pointing deviations. The stepping controller generates an antenna actuator stepping command to step a pointing axis actuator 214 to compensate for the RF antenna LOS pointing deviations.

The RF signal processing electronics and phase detector 208, the RF antenna LOS pointing estimator 209, and the stepping controller 210 may include any number of distinct analog and digital processing modules or components that are configured to perform the tasks, processes, and operations described in more detail herein. Although only three processing blocks are shown in FIG. 2, a practical implementation may utilize any number of distinct analog circuit, digital circuit and/or logical processors, which may be dispersed throughout antenna system 200. In practice, the RF signal phase detector electronics and phase detector 208, the RF antenna LOS pointing estimator 209, and the stepping controller 210 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

FIG. 3 is a table illustrating, for different antenna sizes, the relationship between derived antenna pointing accuracy and RF signal phase detection accuracy. In this table, the wavelength 306 is the wavelength of the RF signal. With the illustrative example of a 6 GHz RF signal, the wavelength is about 0.05 meters. The phase error ratio 308 is a ratio of the estimation error for the distance between the reference signal transmitting horn and the measurement/receiving horns to RF signal phase detection error. The antenna base dimension 310 refers to diameter of the parabolic reflector, and the phase angle error ratio 312 is the ratio of error of derived antenna LOS pointing to RF signal phase detection error. Increasing the antenna base dimension 310 decreases the phase angle error ratio 312, thus reducing the sensitivity of the accuracy of derived antenna LOS pointing to RF signal phase detection error. For example, with an antenna diameter of 1 meter, 1 degree RF signal phase error results in 8 mili-degrees of antenna LOS pointing error, while 1 degree phase error only causes 2 mili-degree LOS error for 5 meter antennas. For a given antenna size, antenna LOS pointing error is directly proportional to RF signal phase detection error. Transporting harness and electronics induced phase variations in RF signal measurement must be corrected in order to achieve pointing precision. As explained above in the background section, the transporting harness induced variation is mostly caused by temperature changes. Electronics induced variations are also caused by changes in the temperature of phase detection circuits.

FIG. 4 is a diagram that illustrates a precision RF antenna pointing system 400 for correcting phase errors caused by transporting harness and electronics (RF signal processing and phase detector circuits). System 400 may include: a reference signal transmit horn 410, reference signal receiving horns 412, a signal processing electronics and phase detector 408, pointing axis actuators 416, parabolic reflector 418, structure 424, transporting harness 406 configured to connect the receiving horns 412 to the signal processing electronics and phase detector 408, transporting harness 402 configured to connect the reference signal transmitting horn 410 to the signal processing electronics and phase detector 408. Transporting harness 404 is used in the system 400 to provide a phase reference for transporting harness 406. System 400 is configured to produce a reference signal 420, which the phase detector multiplexes as three input RF signals: $S_1$ (401), $S_2$ (403), and $S_3$ (405) transported through three transporting harness 402/404/406 to sample the RF signals for phase detection. The multiplexing connects all three input RF signals 401/403/405 to the same processing electronics to minimize signal phase differences that can be caused by using different processing electronics for each of the RF input signals 401/403/405. System 400 may share some elements of antenna system 100 and 200 as described above in the context of FIG. 1 and FIG. 2. Accordingly, certain features, components, and functions of system 400 will not be redundantly described here. For each receiving horn 412, there is a transporting harness 406 and a transporting harness 404 multiplexed at the signal processing electronics and phase detector 408. Thus, for each receiving horn 412, three input RF signals are sampled via multiplexing at the signal processing electronics and phase detector 408, transmitting reference signal $S_1$ (401), phase reference signal $S_2$ (403), and received reference signal $S_3$ (405). Signal $S_1$ (401) is the same as reference signal 420, however, rather than being transmitted through the air it is sent through the transporting harness 402 directly from reference signal transmitting horn 410. Signal $S_2$ (403) is the same as reference signal 420 sent from reference signal transmitting horn 410 through the transporting harness 404 along structure 424 to the receiving horn 412 and then back to the signal processing electronics and phase detector 408. Signal $S_2$ (403) travels the same path as the signal $S_3$ (405), but travels the path twice. Signal $S_3$ (405), is same as the reference signal 420 received by the receiving horn 412 which is sent along the transporting harness 406 to the signal processing electronics and phase detector 408.

As will be explained in detail below in connection to FIG. 5, by introducing the signal $S_2$ (403) through transporting harness 404 it is possible to determine how much the signal $S_2$ (403) has changed when harness temperature changes, and thus determine the transporting harness 404 induced errors to the signal $S_3$ (405). In this regard, error in the signal $S_3$ (405) can be compensated based on measured signal $S_2$ (403) from transporting harness 404.

Figure 5:
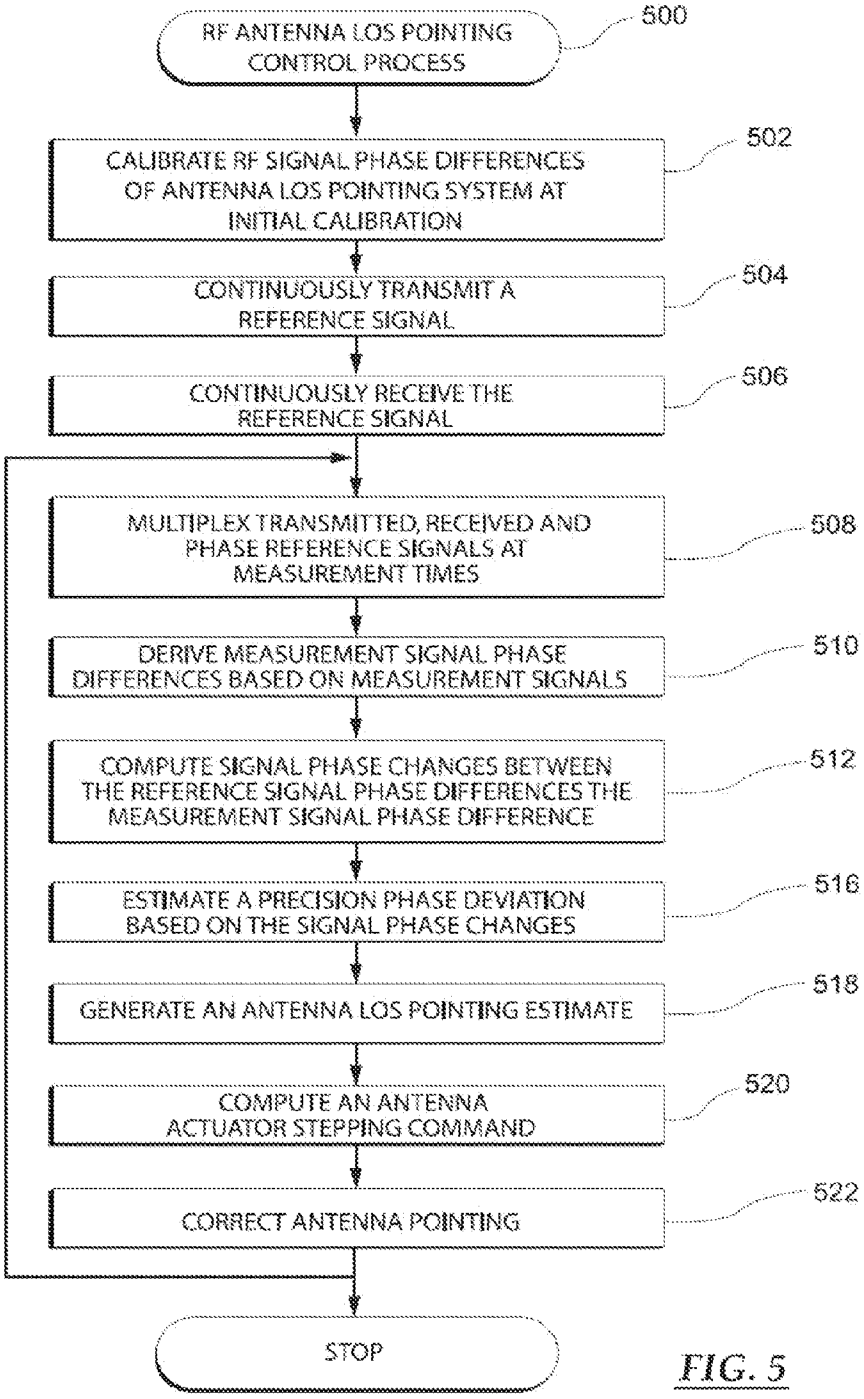
FIG. 5 is a flow chart that illustrates an RF antenna LOS pointing control process.

FIG. 5 is a flow chart that illustrates an RF antenna LOS pointing control process suitable for use in connection with a precision RF antenna LOS pointing control system. The various tasks performed in connection with process 500 may be performed by software, hardware, firmware, or any combination thereof. For illustrative purposes, the following description of process 500 may refer to elements mentioned above in connection with FIGS. 1, 2 and 4. In embodiments of the disclosure, portions of process 500 may be performed by different elements of the described system, e.g., phase detector, antenna LOS pointing estimator, stepping controller, phase detector or the like. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

The process 500 begins calibrating RF signal phase differences of the RF antenna LOS pointing control system at an initial calibration time to obtain reference signal phase differences (task 502) between signals $S_1$ and $S_2$, and between signals $S_1$ and $S_3$. The reference signal phase differences between $S_1$ and $S_2$ ($\phi_{2\_1}^r$) and between $S_1$ and $S_3$ ($\phi_{3\_1}^r$) corresponding to a reference antenna LOS pointing at the initial calibration are described as follows:

$$\phi_{3\_1}^r = \phi_{travel}^r + \phi_{harness} \quad (1)$$

$$\phi_{2\_1}^r 2\phi_{harness} + \phi_a \quad (2)$$

where, $\phi_{travel}^r$ is a reference signal phase change when the reference signal travels the distance between the reference signal transmitting horn and the receiving horns at initial calibration time when spacecraft antenna LOS pointing is at its initial calibration direction, $\phi_{harness}$ is an harness induced phase, $\phi_a$ is phase due to harness physical property and mounting difference between transporting harness 404 and transporting harness 406 due to manufacturing and installation. A deviation from the reference traveling phase $\phi_{travel}^r$ provides an indication that antenna pointing direction is changed from its initial calibration direction, and thus this deviation is used to measure new antenna LOS pointing. This deviation is denoted by $\Delta\phi_{travel}$, and this is what process 500 needs to detect accurately for precision antenna pointing control.

During on-orbit operation, the reference signal is continuously transmitted from the transmitting horn (task 504) and received by the receiving horns (task 506). The signals $S_1$, $S_2$ and $S_3$ (transmitting, phase and received reference signals) are then multiplexed at a measurement time (task 508) as explained above. The phase detector multiplexes signals $S_1$, $S_2$, and $S_3$ which are transported through three transporting harnesses and are sampled by processing electronics and the phase detector. In this regard, process 500 samples $S_1$ (the transmitting reference signal) transported via a first transporting harness that travels through a first mounting path from the reference signal transmitter to the signal phase detector, samples $S_3$ (measurement/received signal) transported via a second transporting harness that travels through a different mounting path from each signal receiver to the signal phase detector, and samples $S_2$ (the phase reference signal) transported via a third transporting harness that travels through the first mounting path from each signal receiver to the signal phase detector at least twice. The multiplexing connects all three input RF signals $S_1$, $S_2$ and $S_3$ to the same processing electronics to minimize signal phase differences that can be caused by using different processing electronics for each of the input RF signals. At every measurement cycle, the RF antenna LOS pointing system will derive phase differences of the multiplexed signals $S_1$, $S_2$ and $S_3$ at a measurement time (task 510) to compute signal phase changes between the reference signal phase differences and the measurement signal phase differences for each receiver horn (task 512). RF signal phases at each of the receiving horns 412 are proportional to the distance that the RF signal travels between the reference signal transmitting horn 410 and each of the receiving horns 412. Therefore, accurately deriving the RF signal phases due to the RF signal traveling this distance provides an accurate estimate of the distance, and therefore an accurate estimate of the RF antenna LOS pointing. The phase due to the distance that the RF signal travels from transmitting horn to a receiving horn is defined as $\phi_{travel}$. This phase $\phi_{travel}$ is estimated by calculating a phase difference between signals $S_3$ and $S_1$. This phase difference can be described as:

$$\phi_{3\_1} = \phi_{travel} + \phi_{harness} + \Delta\phi_{harness} \quad (3)$$

where $\phi_{3\_1}$ is the phase difference between $S_3$ and $S_1$ at a measurement time, $\phi_{travel}$ is the phase due to the distance that the RF signal travels, $\phi_{harness}$ is harness induced phase, and $\Delta\phi_{harness}$ is the phase variations due to temperature or other changes in the harness. Harness induced phase $\phi_{harness}$ and harness phase variation $\Delta\phi_{harness}$ are estimated by measuring the phase difference between signal $S_2$ and signal $S_1$ based on the following relationship:

$$\phi_{2\_1} = 2\phi_{harness} + \phi_a + 2\Delta\phi_{harness} + \Delta\phi_a \quad (4)$$

where $\phi_{2\_1}$ is the phase difference between signal $S_2$ and signal $S_1$ at the measurement time, $\phi_a$ is explained in the context of equation 2 above, $\Delta\phi_a$ is a change in $\phi_a$ caused by temperature changes and other physical conditions, $\phi_{harness}$, and $\Delta\phi_{harness}$ are explained in the context of equation 3 above with phase differences $\phi_{2\_1}$ and $\phi_{3\_1}$ computed at the measurement time of every measurement cycle.

The signal phase changes between phases measured at the measurement time and the phases measured at the initial calibration time are then computed. In this regard, the phase difference ($\phi_{2\_1}$) between $S_2$ and $S_1$ at the measurement time and the phase difference ($\phi_{2\_1}^r$) between $S_2$ and $S_1$ at the initial calibration time are computed based on equations 2 and 4 above which results in the following:

$$\phi_{2\_1} - \phi_{2\_1}^r = 2\Delta\phi_{harness} + \Delta\phi_a \quad (5)$$

where $\phi_{2\_1}$, $\phi_{2\_1}^r$, $\Delta\phi_{harness}$, and $\Delta\phi_a$ are explained above.

Also, the phase difference ($\phi_{3\_1}$) between $S_3$ and $S_1$ at the measurement time, and the phase difference ($\phi_{3\_1}^r$) between $S_3$ and $S_1$ at the initial calibration time are computed based on equations 1 and 3 above which results in the following:

$$\phi_{3\_1}-\phi_{3\_1}^r=\phi_{travel}-\phi_{travel}^r+\Delta\phi_{harness} \quad (6)$$

where, $\phi_{3\_1}$, $\phi_{3\_1}^r$, $\phi_{travel}^r$, and $\Delta\phi_{harness}$ are explained above.

The precision estimate of the phase deviation $\Delta\phi_{travel}$ due to antenna pointing change from initial calibration time is then derived (task 516) from the two computed differences, $\phi^3_{\_1}-\phi_{3\_1}^r$ and $\phi_{2\_1}-\phi_{2\_1}^r$ shown in equations 5 and 6 above which results in the following:

$$\Delta\phi_{travel}=(\phi_{3\_1}-\phi_{3\_1}^r)-\frac{\phi_{2\_1}-\phi_{2\_1}^r}{2} \quad (7)$$

Substituting from equations 5 and 6 into equation (7), the precision estimate of the phase deviation becomes:

$$\Delta\phi_{travel}=(\phi_{travel}-\phi_{travel}^r)+\frac{\Delta\phi_a}{2} \quad (8)$$

where $\phi_{travel}-\phi_{travel}^r$ is the true deviation of the phase from its reference value at initial calibration and is due to antenna pointing change from the initial calibration time, and $\Delta\phi_a$ is explained above. With a precisely manufactured and mounted harness, $\Delta\phi_a$ is a very small number, in this regard equation 8 provides a very accurate estimation of $\Delta\phi_{travel}$.

The precision estimate of phase deviation estimates are then used in antenna LOS pointing estimator to generate an antenna LOS pointing estimate (task 518). The controller then computes an antenna actuator stepping command based the pointing estimates (task 520). Finally, the actuator steps the antenna reflector based on the stepping commands from the stepping controller to correct antenna LOS pointing (task 522). Process 500 then leads back to task 508.

With this approach, precision phase measurements generate precision distance estimation and therefore precision antenna pointing determination. For example, for a RF signal at 6 GHz frequency, one degree phase measurement accuracy enables less than 8 mili-degree antenna pointing accuracy for antenna size larger than one meter in diameter.

While at least one example embodiment has been presented in the foregoing detailed description, it should be appreciated that a vast number of variations exist. It should also be appreciated that the example embodiment or embodiments described herein are not intended to limit the scope, applicability, or configuration of the embodiments of the disclosure in any way. Rather, the foregoing detailed description will provide those skilled in the art with a convenient road map for implementing the described embodiment or embodiments. It should be understood that various changes can be made in the function and arrangement of elements without departing from the scope of the disclosure, where the scope of the disclosure is defined by the claims, which includes known equivalents and foreseeable equivalents at the time of filing this patent application.

What is claimed is:

1. A system for precision radio frequency (RF) antenna line-of-sight (LOS) pointing, the system comprising:

a reference signal transmitter located a distance from an antenna reflector and configured to transmit a reference RF signal toward the antenna reflector to obtain a transmitting reference signal;

a plurality of signal receivers attached to an edge of the antenna reflector, wherein each of the signal receivers is configured to receive the reference signal;

a signal processing electronics and phase detector coupled to the signal receivers by respective signal transportation harnesses, wherein the signal processing electronics and phase detector is configured to obtain estimates of phase differences between the transmitting reference signal and the received reference signal at each of the signal receivers;

a reference signal transportation harness coupled between the reference signal transmitter and the signal processing electronics and phase detector;

a LOS pointing estimator coupled to the signal processing electronics and phase detector and configured to compute estimates of a precision RF antenna LOS pointing deviations using the estimates of the phase differences; and a stepping controller coupled to the LOS pointing estimator and configured to correct the precision RF antenna LOS pointing deviations based upon the estimates of the precision RF antenna LOS pointing deviations; wherein each of the signal receivers is coupled to the signal processing electronics and phase detector by a first signal transportation harness having a first signal path associated therewith;

each of the signal receivers is coupled to the signal processing electronics and phase detector by a second signal transportation harness having a second signal path associated therewith; and the first signal path and the second signal path are different.

2. The system according to claim 1, wherein the stepping controller is further configured to generate an antenna actuator stepping command to step a pointing axis actuator to compensate for the RF antenna LOS pointing deviations.

3. The system of claim 1, wherein the second signal path is at least twice the length of the first signal path.

4. A system according to claim 1, wherein the signal processing electronics and phase detector is further configured to multiplex a plurality of RF signals for each signal receiver to estimate the phase differences.

5. The system according to claim 1, wherein for each of the signal receivers:

the reference signal transportation harness is configured to deliver the transmitting reference signal $S_1$ through a direct signal path from the reference signal transmitter to the signal processing electronics and phase detector;

the first signal transportation harness is configured to deliver a received reference signal $S_3$ through the first signal path from the respective signal receiver to the signal processing electronics and phase detector; and the second signal transportation harness is configured to deliver a phase reference signal $S_2$ through the second signal path from the reference signal transmitter to the signal processing electronics and phase detector.

6. The system according to claim 5, wherein the phase differences follows the following relationships:

$\phi_{3\_1}=\phi_{travel}+\phi_{harness}+\Delta\phi_{harness}$; and $\phi_{2\_1}=2\phi_{harness}+\phi_a+2\Delta\phi_{harness}+\Delta\phi_a$, where $\phi_{3\_1}$ is a phase difference between the received reference signal $S_3$ and the transmitting reference signal $S_1$ at a measurement time, $\phi_{2\_1}$ is a phase difference between the phase reference signal $S_2$ and the transmitting reference signal $S_1$ at the measurement time, $\phi_{travel}$ is a phase due to a distance that a RF signal travels, $\phi_{harness}$ is an harness induced phase, and $\Delta\phi_{harness}$ is a phase variation due temperature or other harness changes, $\phi_a$ is a phase due to harness physical properties and mounting differences between harnesses due to manufacturing and installation, $\Delta\phi_a$ is a change in $\phi_a$ caused by temperature changes and other physical conditions.

7. A method for pointing a radio frequency (RF) antenna line-of-sight (LOS) pointing control system, the method comprising:

calibrating RF signal phase differences of the RF antenna LOS pointing control system at an initial calibration time to obtain reference signal phase differences;

multiplexing measurement signals at measurement times;

deriving measurement signal phase differences based on the measurement signals;

computing signal phase changes between the reference signal phase differences and the measurement signal phase differences;

estimating a precision phase deviation based on the signal phase changes;

generating an antenna LOS pointing estimate based on the precision phase deviation;

computing an antenna actuator stepping command based on the antenna LOS pointing estimate; and correcting RF antenna LOS pointing based on the antenna actuator stepping command.

8. A method for precision radio frequency (RF) antenna line-of-sight (LOS) pointing, the method comprising:

continuously transmitting a reference signal $S_1$ toward an antenna reflector to obtain a transmitting reference signal $S_1$;

continuously receiving the reference signal $S_1$ at reference signal receivers attached to an edge of the antenna reflector;

deriving phase difference estimates between the reference signals received at signal receivers and signal transmitted from a signal transmitter;

computing estimates of precision RF antenna LOS pointing deviations using the phase difference estimates; and correcting RF antenna LOS pointing errors based upon the estimates of the precision RF antenna LOS pointing deviations; wherein the deriving step further comprises:

sampling the transmitting reference signal $S_1$ transported via a first transporting harness, wherein the first transporting harness travels through a first mounting path from a reference signal transmitter to a signal processing electronics and phase detector;

sampling a received reference signal $S_3$ transported via a second transporting harness, wherein the second transporting harness travels through a second mounting path from each of the respective reference signal receivers to the signal processing electronics and phase detector; and sampling a phase reference signal $S_2$ transported via a third transporting harness from the reference signal transmitter; wherein the third transporting harness travels through the second mounting path from each of the respective reference signal receivers to the signal processing electronics and phase detector at least twice.

9. The method according to claim 8, further comprising an initial calibration based on the following relationships:

$\phi_{3\_1}{}^r=\phi_{travel}{}^r+\phi_{harness}$; and $\phi_{2\_1}{}^r=2\phi_{harness}+\phi_a$, where $\phi_{3\_1}{}^r$ is a reference phase difference between the transmitting reference signal $S_1$ and a received reference signal $S_3$ at an initial calibration time, $\phi_{2\_1}{}^r$ is a reference phase difference between the transmitting reference signal $S_1$ and a phase reference signal $S_2$ at the initial calibration time, $\phi_{harness}$ is an harness induced phase, $\phi_{travel}{}^r$ is a reference signal phase change when the transmitting reference signal $S_1$ travels a distance between a reference signal transmitting horn and receiving horns at the initial calibration time, and $\phi_a$ is a phase due to harness physical properties and mounting difference between harnesses due to manufacturing and installation.

10. The method according to claim 8, wherein the estimate of the precision RF antenna LOS pointing deviations are based on the following relationship:

$$\Delta\phi_{travel} = (\phi_{3\_1} - \phi_{3\_1}^r) - \frac{\phi_{2\_1} - \phi_{2\_1}^r}{2},$$

where $\Delta\phi_{travel}$ is a phase deviation due to antenna pointing change from an initial calibration time, $\phi_{3\_1}$ is a phase difference between a received reference signal $S_3$ and the transmitting reference signal $S_1$ at a measurement time, $\phi_{2\_1}$ is a phase difference between a phase reference signal $S_2$ and the transmitting reference signal $S_1$ at a measurement time, $\phi_{3\_1}{}^r$ is a reference phase difference between the transmitting reference signal $S_1$ and a received reference signal $S_3$ at an initial calibration time, and $\phi_{2\_1}{}^r$ is a reference phase difference between the transmitting reference signal $S_1$ and a phase reference signal $S_2$ at the initial calibration time.

* * * * *